(12) United States Patent
Nagasaka et al.

(10) Patent No.: US 8,970,996 B2
(45) Date of Patent: Mar. 3, 2015

(54) SPIN-TORQUE OSCILLATOR FOR MICROWAVE ASSISTED MAGNETIC RECORDING

(71) Applicant: HGST Netherlands B.V., Amsterdam (NL)

(72) Inventors: Keiichi Nagasaka, Isehara (JP); Masato Shiimoto, Odawara (JP); Masato Matsubara, Yokohama (JP); Yuta Udou, Odawara (JP)

(73) Assignee: HSGT Netherlands B.V., Amsterdam (NL)

( * ) Notice: Subject to any disclaimer, the term of this patent is extended or adjusted under 35 U.S.C. 154(b) by 0 days.

(21) Appl. No.: 13/629,401

(22) Filed: Sep. 27, 2012

(65) Prior Publication Data

US 2014/0085753 A1    Mar. 27, 2014

(51) Int. Cl.
    *G11B 5/127*    (2006.01)
(52) U.S. Cl.
    USPC ........................................ 360/324; 360/125.3
(58) Field of Classification Search
    USPC .............................................. 360/125.3, 324
    See application file for complete search history.

(56) References Cited

U.S. PATENT DOCUMENTS

| 7,821,748 | B2 | 10/2010 | Fukuzawa et al. | |
| 8,064,244 | B2 * | 11/2011 | Zhang et al. | 365/158 |
| 2008/0102315 | A1 * | 5/2008 | Fukuzawa et al. | 428/811.2 |
| 2009/0162698 | A1 * | 6/2009 | Fukuzawa et al. | 428/811.2 |
| 2009/0225465 | A1 | 9/2009 | Iwasaki et al. | |
| 2009/0257151 | A1 * | 10/2009 | Zhang et al. | 360/324.2 |
| 2009/0316303 | A1 * | 12/2009 | Yamada et al. | 360/234.3 |
| 2010/0110592 | A1 * | 5/2010 | Koui et al. | 360/324 |
| 2010/0134922 | A1 * | 6/2010 | Yamada et al. | 360/123.01 |
| 2011/0279921 | A1 * | 11/2011 | Zhang et al. | 360/59 |

OTHER PUBLICATIONS

Neise et al., "The effect of chemical disorder on the magnetic anisotropy of strained Fe—Co films," Physica Status Solidi, Mar. 29, 2011, pp. 1-7.

Tomoya, N., "Spin-dependent scattering in CPP-GMR using Heusler alloy and the selection of the spacer material," Submitted to the Graduate School of Pure and Applied Sciences in Partial Fulfillment of the Requirements for the Degree of Doctor of Philisophy in Engineering, University of Tsukuba, Feb. 7, 2011, pp. 1-158.

* cited by examiner

*Primary Examiner* — Wayne Young
*Assistant Examiner* — Carlos E Garcia
(74) *Attorney, Agent, or Firm* — Zilka-Kotab, PC

(57) ABSTRACT

A microwave assisted magnetic recording write head having a spin torque oscillator capable of producing high strength high frequency magnetic oscillations with reduced applied current. The spin torque oscillator uses a magnetic field generation layer with a high moment material including such as Fe and Co that is formed on an interlayer having a face centered cubic (fcc) crystal structure, that functions as an under-layer. The high moment magnetic field generation layer has also reduced magnetic damping.

20 Claims, 6 Drawing Sheets

SPIN-TORQUE OSCILLATOR FOR MICROWAVE ASSISTED MAGNETIC RECORDING

FIELD OF THE INVENTION

The present invention relates to magnetic data recording and more particularly to a microwave assisted magnetic recording system employing an improved spin-torque oscillator capable of supplying improved high frequency magnetic oscillations with reduced electrical current.

BACKGROUND OF THE INVENTION

Over the past few years, a rapid increase in recording density has been pursued at an annual rate of approximately 40% for magnetic recording devices, such as hard disk drives (HDDs). Areal recording density is expected to reach 2 terabits (Tb)/in$^2$. In order to improve the areal recording density, it is important to miniaturize the magnetic write head and the read head, and to reduce the particle size of the magnetic recording medium.

However, challenges with regard to inadequate recording performance are predicted because the magnetic write field strength is reduced by the miniaturization of the magnetic write head. In addition, the coercive force and the anisotropic energy of a magnetic recording medium must be increased simultaneously to reducing the particle size because the problem of thermal fluctuations arises when the particle size of the magnetic recording medium is reduced. As a result, recording becomes difficult. Consequently, it is necessary to improve recording performance in order to improve the areal recording density. One proposal is assisted recording that temporarily lowers the coercive force (reversal magnetic field) of the magnetic recording medium only during recording by applying heat or a high-frequency magnetic field.

Methods for applying a high-frequency magnetic field, sometimes referred to as microwave-assisted magnetic recording (MAMR), have gained attention over the past few years. In MAMR, information is recorded by applying a high strength, high frequency magnetic field in the microwave band to a region on the order of nanometers to locally excite the recording medium and lower the magnetization reversal magnetic field.

SUMMARY OF THE INVENTION

The present invention provides a magnetic write head for magnetic data recording that includes a magnetic write pole and a spin torque oscillator located adjacent to the magnetic write pole. The spin torque oscillator includes: a magnetic spin injection layer; a magnetic field generation layer; a first non-magnetic interlayer disposed between the magnetic spin injection layer and the magnetic field generation layer; and a second interlayer disposed adjacent to the magnetic field generation layer, the second interlayer comprising a non-magnetic material having a face centered cubic crystal structure.

The magnetic field generation layer can be constructed of a magnetic material having a face centered cubic (fcc) structure such as CoFe, preferably having an Fe content of 25-100 atomic percent. When the fcc structured magnetic field generation layer is formed over a layer that has a body centered cubic (bcc) structure, the magnetic layer has a reduced magnetic damping constant which leads to a much more efficient magnetic oscillation generation. This allows a higher strength magnetic oscillation to be produced with reduced applied magnetic field.

In the present invention, FeCo having a high Bs composition region (body-centered cubic (bcc) crystal structure region) or a material based on that composition region is used as the high-frequency magnetic field generation layer (FGL) of a microwave oscillator, a spin torque oscillator (STO) of a magnetic recording head for microwave-assisted magnetic recording (MAMR). Furthermore, a material having a face-centered cubic (fcc) crystal structure is combined and used as an under-layer material.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE PREFERRED EMBODIMENTS

The following description is of the best embodiments presently contemplated for carrying out this invention. This description is made for the purpose of illustrating the general principles of this invention and is not meant to limit the inventive concepts claimed herein.

Figure 1:
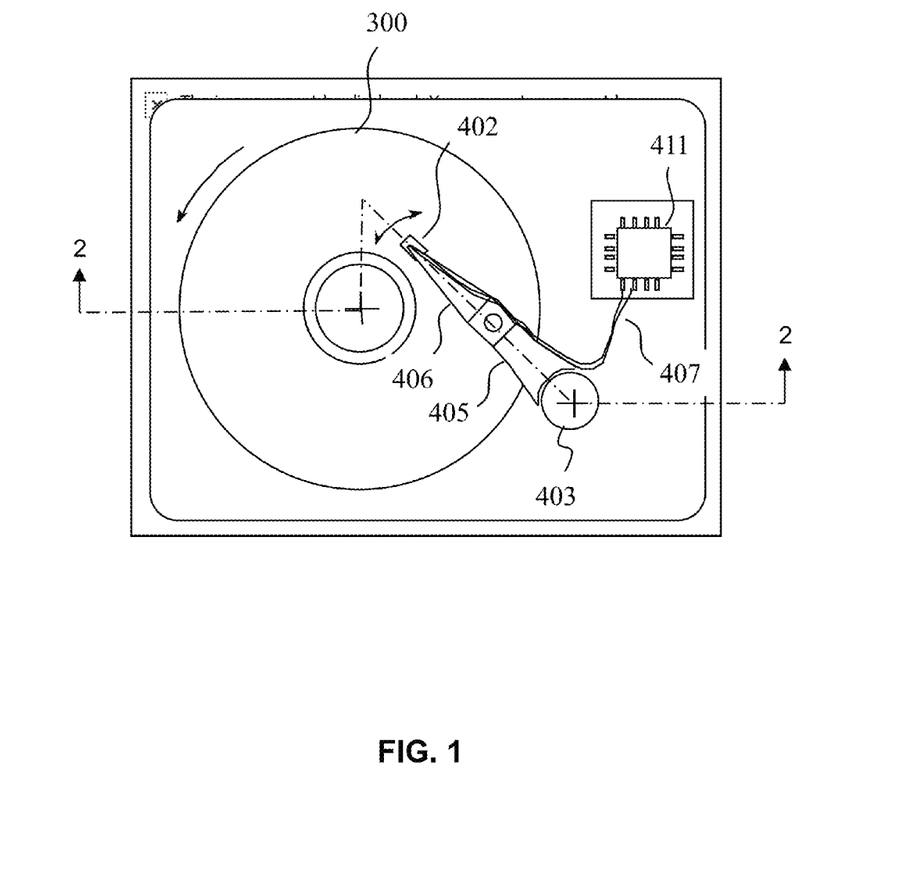
FIG. 1 is a top-down schematic illustration of a disk drive system in which the invention might be embodied.
Figure 2:
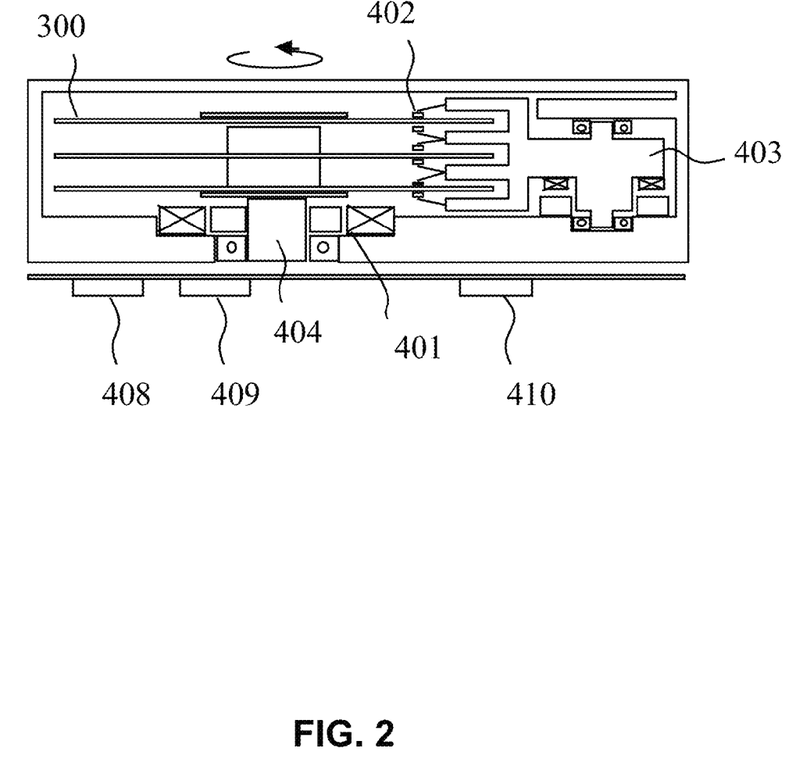
FIG. 2 is a side, cross sectional view of the disk drive system of FIG. 1 as taken from line 2-2 of FIG. 1.

FIGS. 1 and 2 are schematic views showing a magnetic recording device in which the present invention might be embodied. FIG. 1 is a top down view of the magnetic recording device, and FIG. 2 is a side, cross sectional view as seen from line 2-2 of FIG. 1. A magnetic recording medium (magnetic disk) 300 is secured on a rotation bearing 404 and rotated by a motor 401. FIG. 2 shows an example of three mounted magnetic disks and six mounted magnetic heads. There may be one or more magnetic disks and one or more magnetic heads. The magnetic recording medium 300 has a recording layer formed on both sides. A slider 402 moves roughly in the radial direction above the surface of a rotating recording medium and has a magnetic head formed on its trailing edge. The magnetic head will be described in greater detail herein below. A suspension 406 is supported via an arm 405 by a rotary actuator 403. The suspension 406 pushes slider 402 into or separates it from the magnetic recording medium 300 by a specified load. By using the rotary actuator 403 to drive the arm 405, the magnetic head mounted on the slider 402 is positioned over a specified track above the magnetic recording medium 300.

The current for driving each structural element of the magnetic head is supplied from an IC amplifier 411 through a wire 407. Processing of the recording signal supplied to the recording head unit or the playback signal detected from the read head unit is implemented by a channel IC 410 for reading and writing. In addition, control of the magnetic recording and playback device is implemented by a processor 408, executing a program for disk control stored in memory 409. Consequently, in this working example, the processor 408 and the memory 409 can be referred to as a disk controller.

The present invention is not limited to implementation in a disk drive system as described above and can include various modified examples. The working examples described above were explained in detail to facilitate understanding of the present invention, and are definitely not limited to providing the entire structures described above. The structure of a particular working example may also be added to the structure of another working example. In addition, a portion of the structure of a particular working example can be added, deleted, or replaced by another structure.

Figure 3:
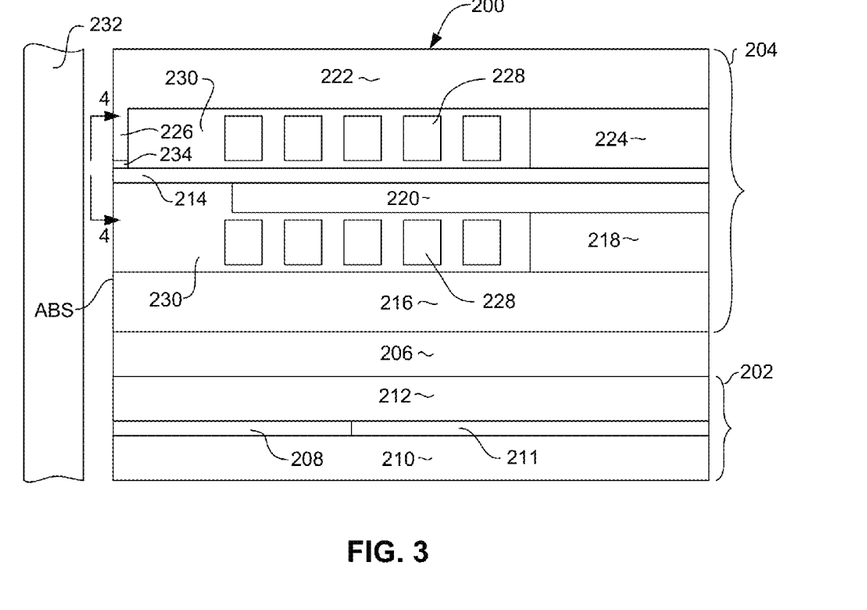
FIG. 3 is a side, cross sectional, schematic view of a magnetic head in which a spin-torque oscillator of the present invention might be embodied.

FIG. 3 shows a side cross sectional view of magnetic head 200 that can include a read element 202 and a write element 204. The read element 202 and write element 204 can be separated by a non-magnetic, electrically insulating layer 206 such as alumina or can be merged together.

The read element 202 can include a magnetoresistive sensor 208 such as giant magnetoresistive (GMR) sensor or a tunnel junction magnetoresistive (TMR) sensor. The magnetoresistive sensor 208 can be sandwiched between first and second magnetic shields 210, 212 that can be constructed of an electrically conductive material so that they function as electrical leads as well as magnetic shields. The space between the shields 210, 212 that is not occupied by the sensor 208 can be filled with an electrically insulating, non-magnetic fill layer 211, such as alumina.

The magnetic write head 204 includes a magnetic write pole 214 that extends to an air bearing surface (ABS). The write head 204 can also include a leading magnetic return pole 216 that also can extend to the air bearing surface. A magnetic back gap layer 218 can be connected with the leading magnetic return pole 216 and can itself be connected with the stitched pole 220 (also referred to as a shaping layer) that is connected with the write pole 214 and which functions to conduct magnetic flux to the write pole 214. A trailing magnetic return pole 222 can also be provided and can be magnetically connected with the back end of the write pole 214 by a magnetic back gap layer 224. An optional trailing magnetic shield 226 can be formed at the ABS, and functions to improve the write field gradient. The trailing shield 226 can be connected with or integral with the trailing return pole 222.

One or more non-magnetic, electrically conductive write coils 228, shown in cross section in FIG. 3, pass above and/or below the write pole 214. The write coil 228 can be constructed of Cu and can be embedded in a non-magnetic, electrically insulating fill material such as alumina 230. When an electrical current flows through the write coil 228, a resulting magnetic field causes a magnetic flux to flow through the write pole 214. This causes a magnetic write field to pass through to an adjacent magnetic medium 232, the write field being sufficiently focused and strong to magnetize a high coercivity magnetic recording layer of the magnetic media 232. The write field passes through the magnetic media to return to the return pole 216 and/or 222. The return poles 216, 222 each have an area at the ABS that is significantly larger than that of the write pole 214 so that when the magnetic write field passes from the media 232 to the return poles 216, 222 the write field is sufficiently spread out and week that it does not erase the previously recorded bit of data.

As the data density of recording systems increase, several challenges arise. For example, in order to make the magnetic bits ever smaller it is necessary to make the tip of the write pole 214 smaller, and make the write element 204 in general smaller. As the write pole 214 becomes smaller it becomes ever more difficult to generate a sufficiently strong write field to magnetize the high coercivity recording layer of the magnetic media 232. To make matters worse, as the size of the magnetic bits and spacing between the bits become smaller, the data becomes more prone to demagnetization. In other words the data becomes less stable. In order to ensure that the data remains stable, the coercivity of the recording layer must be increased even more. This makes it even harder to produce a sufficiently strong write field to write to the media.

One way to overcome these challenges is to use what has been referred to as microwave assisted magnetic recording (MAMR). In such a system, a magnetic oscillator 234 is placed in the write element 204, preferably at a location adjacent to the tip of the write pole 214. This magnetic oscillator generates an oscillating magnetic field at the location of the tip of the write pole 214 which temporarily reduces the coercivity of the magnetic media 232, making it easier to write to the magnetic media 232.

Over the past few years, the recording density demanded in magnetic recording has exceeded approximately 1 Tb/in$^2$. When this level of recording density is realized in MAMR, it is important to reduce the magnetization-reversal magnetic field and to record information when a high-strength, high-frequency magnetic field irradiates a region on the order of nanometers and the magnetic recording medium 232 is in a local magnetic field resonance state. In MAMR, it is important to generate a high strength, high frequency magnetic field from the oscillator of the magnetic recording head.

In a spin torque oscillator (STO), the application of an electrical current results in an electron spin induced magnetic resonance in a magnetic field generation layer. In order to apply the spin torque to the magnetic field oscillation layer, the electron spins must be oriented, and a spin injection layer is provided for this purpose. Because the direction of magnetization of this spin injection layer is arranged in one direction, the transmitted electron spins are arranged in one direction. By injecting electron spins oriented in one direction into the magnetic field generation layer, torque can be applied to the magnetization of the magnetic field generation layer. Furthermore, the magnetization of the magnetic field generation layer is oscillated by the spin torque, achieving anisotropy in the magnetic field generation layer and equilibrium with external magnetic fields.

An assisted magnetic field having a high frequency exceeding 10 GHz is necessary in order to improve the assist effect and record at a high density. By increasing the anisotropy of the magnetic field oscillation layer and increasing the external magnetic field, (such as the field from the main magnetic write pole) the oscillation frequency can be increased. In order to excite oscillation, spin torques counterbalancing these magnetic fields must be applied. However, if the applied current to the oscillator is increased in order to increase the spin torque, heat generation, migration of the elements, and element destruction occur. Therefore, it is desirable to maximize the efficiency of the spin torque oscillator in order to minimize the amount of current and associated heat required.

In addition, it is effective to use a magnetic material having a high magnetic moment in the magnetic field generation layer in order to generate a high-strength, high-frequency magnetic field. To this end, the magnetic field generation layer can be constructed of a Co—Fe alloy or similar material. A high magnetic moment and low damping characteristic of the magnetic field generation layer are desirable in order to improve the spin torque efficiency in a composition region having a high magnetic moment.

An objective of the present invention is to obtain an oscillator for generating a high-strength, high-frequency magnetic field even with a small oscillating current by improving the constituent material of the thin film used in the oscillator in microwave-assisted recording by a method using an oscillator for generating a high-frequency magnetic field.

Figure 4:
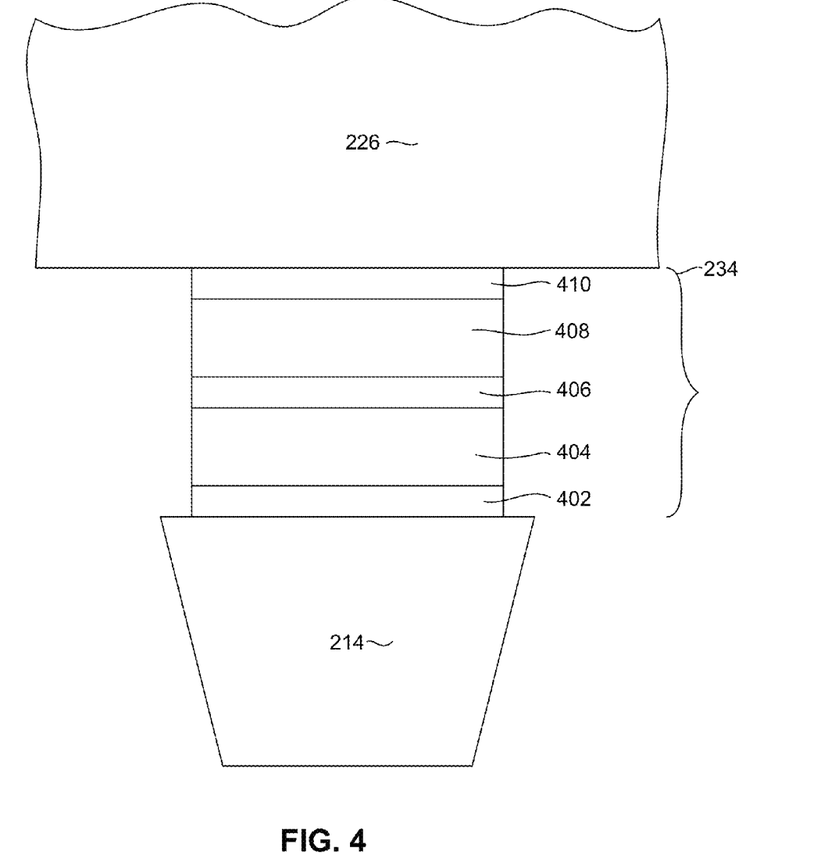
FIG. 4 is an enlarged ABS view of a portion of the magnetic head of FIG. 3 as seen from line 4-4 of FIG. 3, illustrating a spin-torque oscillator according to an embodiment of the invention.

FIG. 4 shows an enlarged air bearing surface view as seen from line 4-4 of FIG. 3. FIG. 4 shows a magnetic oscillator in the form of a spin torque oscillator 234 that is located between the write pole 214 and the trailing magnetic shield 226. The spin torque oscillator includes a spin injection layer 408 and a magnetic field generation layer 404. A first interlayer 406 is sandwiched between the spin injection layer 408 and the magnetic field generation layer 404. The spin torque oscillator also includes a second interlayer 402 at its leading most end adjacent to the write pole 214 and a third interlayer 410 located at its trailing most end adjacent to the trailing shield 226. The spin injection layer 408 has a magnetization that is pinned in a desired direction, whereas the magnetization of the magnetic field generation layer 404 is free to move so as to generate a magnetic oscillation.

The first interlayer 406 functions to effectively propagate the electron spin from the spin injection layer 610 to the magnetic field generation layer 604 and block or suppress the magnetic coupling of the magnetizations of the spin injection layer 608 and magnetic field generation layer 404. For example, a non-magnetic material such as Cu, Ag, Au, Cr or an alloy of these materials with proper thickness is preferred and can be used in the first interlayer 406.

The second interlayer 402 functions as an under-layer to promote desired magnetic properties in the magnetic field generation layer. Effectively performing microwave assisted magnetic recording requires that magnetic field generation layer generate a high-strength, high-frequency magnetic field. To that end, the magnetic field generation is constructed of a magnetic material having a high saturation magnetic moment, such as a Co—Fe alloy. By using a composition of 25 to 100 atomic percent Fe, a saturation magnetic moment greater than 2.1 T is obtained. Furthermore, when the Fe content is 50 to 85 atomic percent, a saturation magnetic moment greater than 2.4 T can be obtained. A Co—Fe composition that obtains these high saturation magnetic moments is a composition that has a body centered cubic (bcc) crystalline structure. In addition, the magnetization of the field generation layer 404 must be able to generate a magnetization that oscillates at a very high frequency on the order of gigahertz (GHz) in order to effectively perform microwave assisted magnetic recording. In addition, the spin torque oscillator 234 must be able to efficiently produce this magnetic oscillation from a limited electrical current applied across the pole 214 and shield 226.

Figure 5:
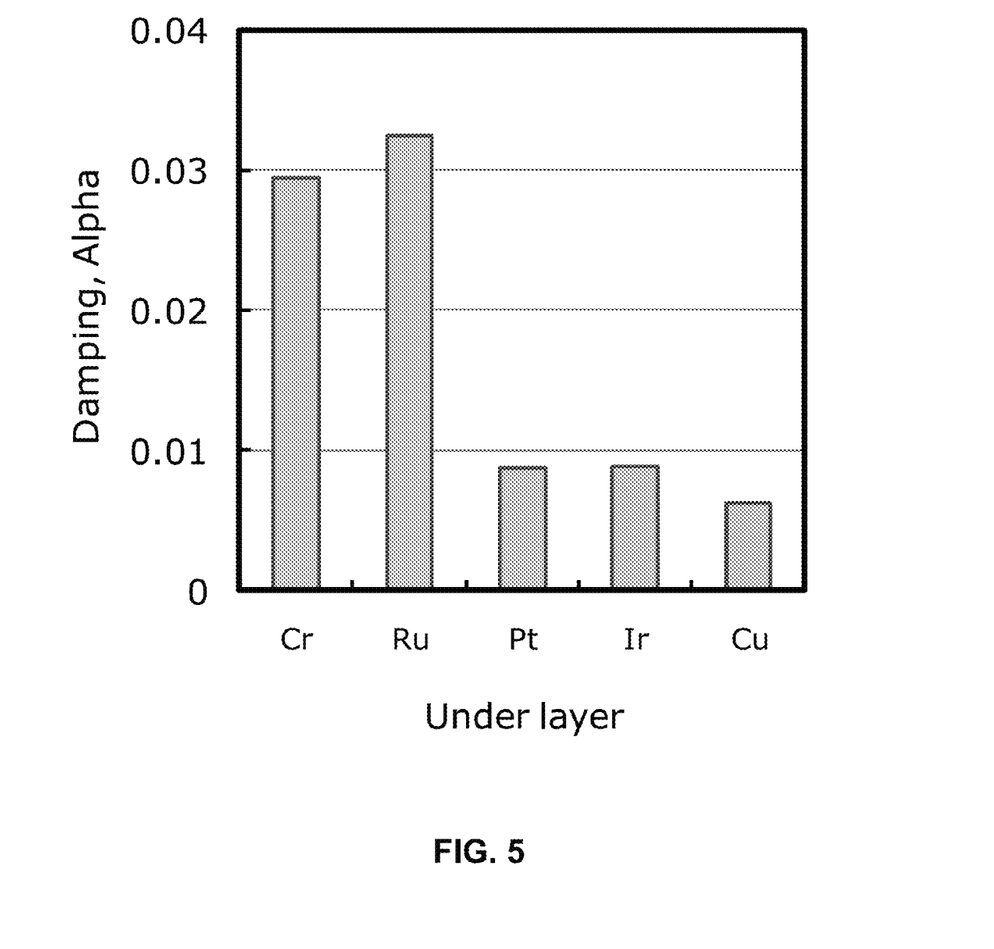
FIG. 5 is a graph illustrating damping constants of various materials that might be used in a spin torque oscillator.

FIG. 5 shows the damping constant of a 7 nm thick Co—Fe magnetic material deposited on various types under-layer material, each having a thickness of 5 nm. A body centered cubic (bcc) composition region with 50 atomic percent respectively of Co and Fe was used for the overlying Co—Fe magnetic layer. The magnetic material and under-layer can be deposited on a glass substrate. Each material can be deposited in a layer by DC magnetron sputtering. A 10 nm thick Cu film can be deposited on top as a protective layer. The damping characteristics of a prototype sample can be evaluated by using a coplanar waveguide and the magnetic resonance phenomenon. When a Cr under-layer having bcc crystal structure is used, the damping constant of the Co—Fe magnetic material is 0.03. This damping constant is identical to the case of a Ru under-layer having a hexagonal close packed (hcp) crystal structure. When a Pt, Ir, Cu under-layer material having an fcc crystal structure is used, the damping constant of the Co—Fe material formed on top is no more than 0.01 which is substantially less than with the other under-layer materials. In addition to the materials described above, the effect can also be obtained using a Ni—Cr or Ni—Fe material having a face centered cubic (fcc) structure as the under-layer 402. A structure combining these materials may also be used.

The damping characteristics of a magnetic material depend on spin orbit coupling. By using an under-layer having an fcc crystal structure, the crystal structure of the overlying Co—Fe having a bcc structure changes. The spin orbit coupling decreases, and the damping characteristic decreases. Similarly, by using an under-layer material having an fcc crystal structure, a Co—Fe magnetic material capable of establishing both a high saturation magnetic moment and low damping characteristic can be realized. In FIG. 4, by using this type of material having an fcc crystal structure in the second interlayer 402, the Co—Fe material used in the magnetic field generation layer 404 can oscillate at high frequency even with a small applied electrical current, because of the low damping characteristics. A high strength, high frequency magnetic field can be generated from the high saturation magnetic moment characteristic. In FIG. 5, Co—Fe was used as the magnetic material, but a similar effect can be obtained even when another metal is added to the Co—Fe. For example, a Heusler alloy such as CoFeGe, CoFeAl, CoFeSi, can be used as a material having a high spin injection efficiency. In addition, a layered structure of Co and Fe thin films in a layered structure including layers of an alloy including Co—Fe and another element could be used as well.

Figure 6:
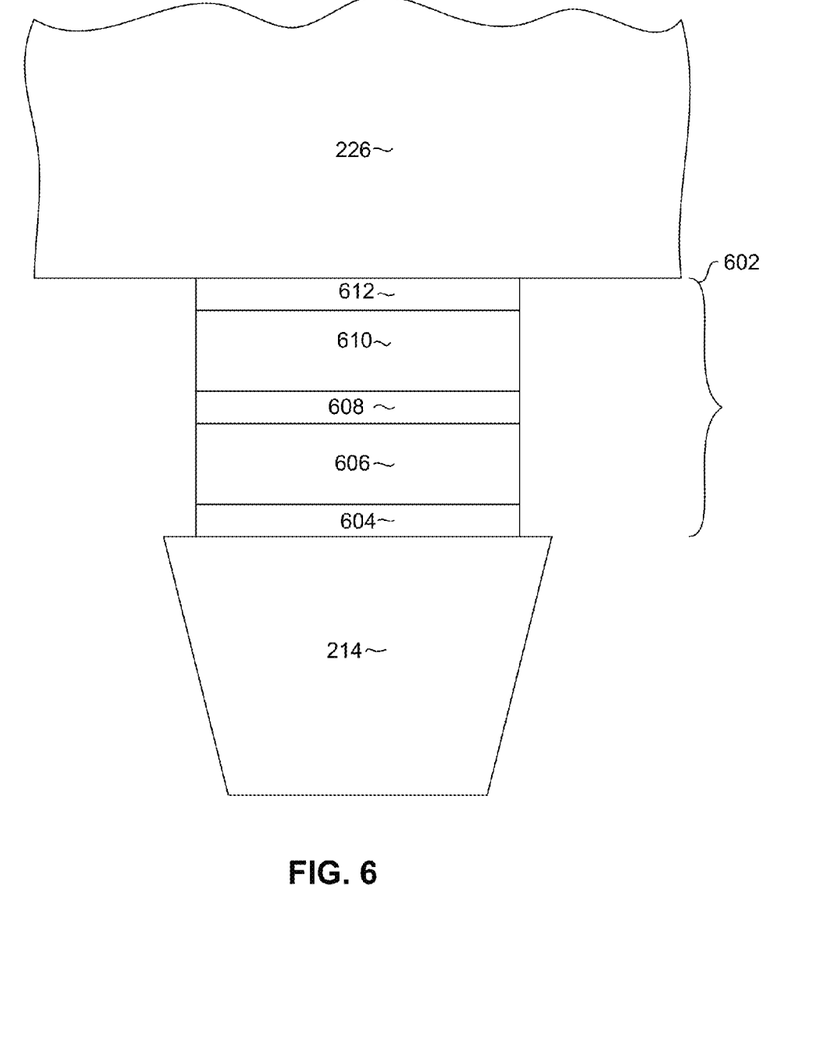
FIG. 6 is a view similar to that of FIG. 4, illustrating a spin torque oscillator according to an alternate embodiment of the invention.

FIG. 6 shows another possible embodiment of the invention including a spin torque oscillator 602 wherein the order of the magnetic field generation layer 610 and the spin injection layer 606 is reversed relative to the spin torque oscillator 234 described above with reference to FIG. 4. In the spin torque oscillator 602 of FIG. 6, the magnetic field generation layer 610 is located in a trailing direction closer to the magnetic shield 226 between the trailing shield 226 and the first interlayer 608. The spin injection layer 606 is located in a leading direction closer to the write pole 214, between the write pole 214 and the first interlayer 608. In this embodiment, the second interlayer 612 contacts the top or trailing surface of the magnetic field generation layer 610 and is located between the magnetic field generation layer 610 and the trailing magnetic shield 226. A third interlayer 604 can be located between the spin injection layer 606 and the write pole 214. By using the above described materials having bcc crystal structures in the second interlayer 612 and changing the crystal structure of that material by a thermal process, the crystal structure of the material making up the magnetic field generation layer 610 is changed, and a similar effect as described above with regard to FIGS. 4 and 5 can be achieved.

With regard to either of the above described embodiments (spin torque oscillator 234 of FIG. 4, or 602 of FIG. 6) it is desirable that the magnetization of the spin injection layer 408 (FIG. 4) or 606 (FIG. 6) be oriented generally perpendicular to the film plane. This can be achieved by using a material having a magnetic anisotropy that is perpendicular to the film plane for the spin injection layer 408, 606. For example, the spin injection layer 408, 606 can be constructed of an alloy such as CoPt, CoCrPt, CoPd, FePt, CoFePd, TbFeCo, or a multilayer film structure such as Co/Pt, Co/Pd, Co/Ni could be used. In addition, the gap magnetic field from the main magnetic pole 214 to the trailing shield 226 can be used to pin magnetization of the magnetic layer of the spin injection layer in the direction perpendicular to the film surface. In this case, in addition to a film having perpendicular magnetic anisotropy, a film having in-plane magnetic anisotropy may be used. In particular, from the perspective of improving the spin injection rate, a Heusler alloy or Co—Fe—B can be used.

With either of the above described embodiments, when a small electrical current is applied to the spin torque oscillator 234, 602, a high strength, high frequency magnetic field can be generated. Therefore, improved reliability and a longer life of the oscillator can be realized by designing a more efficient microwave assisted recording system. Thus, a microwave assisted magnetic recording method and better performance such as a higher magnetic recording density and greater stability in the magnetic recording device is realized.

While various embodiments have been described above, it should be understood that they have been presented by way of example only and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A magnetic write head for magnetic data recording, comprising:
a magnetic write pole; and
a spin torque oscillator located adjacent to the magnetic write pole, the spin torque oscillator further comprising:
a magnetic spin injection layer, comprising Co—Fe—B;
a magnetic field generation layer comprising an alloy containing one or more of Fe and Co and having a body centered cubic crystalline structure;
a first non-magnetic interlayer disposed between the magnetic spin injection layer and the magnetic field generation layer; and
a second interlayer disposed adjacent to the magnetic field generation layer, the second interlayer comprising a non-magnetic material having a face centered cubic crystal structure, the magnetic field generation layer having the body centered cubic crystalline structure being formed on the second interlayer having the face centered cubic crystalline structure.

2. The magnetic write head as in claim 1 wherein the magnetic field generation layer comprises Co—Fe having a Fe content of 25 to 100 atomic percent.

3. The magnetic write head as in claim 1 wherein the magnetic field generation layer is a multi-layered structure.

4. The magnetic write head as in claim 1 wherein the magnetic field generation layer comprises a Heusler alloy.

5. The magnetic write head as in claim 4 wherein the magnetic field generation layer comprises one or more of CoFeGe, CoFeAl and CoFeSi.

6. The magnetic write head as in claim 1 wherein the spin injection layer further comprises one or more of Co—Pt, Co—Cr—Pt, CoPd, Fe—Pt, Co—Fe—Pd or Tb—Fe—Co.

7. The magnetic write head as in claim 1 wherein the spin injection layer comprises a multi-layered structure further comprising Co and Pt, Co and Pd, or Co and Ni.

8. The magnetic write head as in claim 1 wherein the spin injection layer further comprises a Heusler alloy.

9. The magnetic write head as in claim 1 wherein the magnetic field generation layer is located between the write pole and the first interlayer and spin injection layer, and wherein the second interlayer is located between the magnetic field generation layer and the write pole.

10. The magnetic write head as in claim 1 wherein the magnetic field generation layer is located between the write pole and the first interlayer, and wherein the second interlayer is located between the magnetic field generation layer and the write pole, and wherein the spin injection layer is located between the first interlayer and a trailing magnetic shield.

11. The magnetic write head as in claim 1 wherein the spin injection layer is located between the write pole and the first interlayer, and wherein the magnetic field generation layer is located between the first interlayer and a trailing magnetic shield, and wherein the second interlayer is located between the magnetic field generation layer and the trailing magnetic shield.

12. The magnetic write head as in claim 10 wherein the magnetic field generation layer has been thermally treated to change its crystal structure.

13. The magnetic write head as in claim 1 wherein the magnetic field generation layer comprises a magnetic material having a body centered cubic structure.

14. The magnetic write head as in claim 1, wherein the second interlayer comprises one or more of Pt, Ir, or Ni—Fe.

15. A magnetic data recording system, comprising:
a housing;
a magnetic media mounted within the housing
a slider;
an actuator connected with the slider for moving the slider adjacent to a surface of the magnetic media; and
a write head formed on the slider, the write head further comprising:
a magnetic write pole; and
a spin torque oscillator located adjacent to the magnetic write pole, the spin torque oscillator further comprising:
a magnetic spin injection layer comprising Co—Fe—B;
a magnetic field generation layer comprising an alloy containing one or more of Fe and Co and having a body centered cubic crystalline structure;
a first non-magnetic interlayer disposed between the magnetic spin injection layer and the magnetic field generation layer; and
a second interlayer disposed adjacent to the magnetic field generation layer, the second interlayer comprising a non-magnetic material having a face centered cubic crystal structure, the magnetic field generation layer having the body centered cubic crystalline structure being formed on the second interlayer having the face centered cubic crystalline structure.

16. The magnetic data recording system as in claim 15 wherein the magnetic field generation layer comprises a magnetic material having a body centered cubic crystal structure.

17. The magnetic data recording system as in claim 15 wherein the magnetic field generation layer comprises Co—Fe having a Fe content of 25 to 100 atomic percent.

18. The magnetic data recording system as in claim 15 wherein the magnetic field generation layer comprises a Heusler alloy.

19. The magnetic data recording system as in claim 15 wherein the magnetic field generation layer is a multi-layered structure.

20. The magnetic data recording system as in claim 15, wherein the second interlayer comprises one or more of Pt, Ir, or Ni—Fe.

\* \* \* \* \*